US012103765B1

(12) United States Patent
O'Donnell, Jr. et al.

(10) Patent No.: US 12,103,765 B1
(45) Date of Patent: Oct. 1, 2024

(54) VEHICLE TRAILER OR SHIPPING CONTAINER MONITORING AND EVACUATION ASSEMBLY

(71) Applicant: U.S. Army Combat Capabilities Development Command, Chemical Biological Center, APG, MD (US)

(72) Inventors: Brian J O'Donnell, Jr., Bel Air, MD (US); Jeffrey M Kiley, Reisterstown, MD (US); Amy L Dean, Havre de Grace, MD (US); Michael C Glorioso, Pasadena, MD (US); Michael Richter, Lake George, NY (US); Donnie Lester, Joplin, MO (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 262 days.

(21) Appl. No.: 17/879,141

(22) Filed: Aug. 2, 2022

(51) Int. Cl.
*B65D 90/48* (2006.01)
*B65D 90/22* (2006.01)

(52) U.S. Cl.
CPC ............. *B65D 90/48* (2013.01); *B65D 90/22* (2013.01)

(58) Field of Classification Search
CPC ...................................... B65D 90/48
USPC .......................................... 141/65
See application file for complete search history.

(56) References Cited

U.S. PATENT DOCUMENTS

2021/0330840 A1*  10/2021  Staack ................. A61L 2/202
2023/0217915 A1*   7/2023  Davis .................. B65D 88/121
                                                    220/212

* cited by examiner

*Primary Examiner* — Jason K Niesz
(74) *Attorney, Agent, or Firm* — Ulysses John Biffoni

(57) ABSTRACT

A vehicle or shipping-container monitoring system is provided. The system is used to sample the interior environment of the container and if needed, clear a potentially hazardous material from the interior of the container prior to conventional opening. The system includes a monitoring assembly affixed to a first through-penetration in the vehicle container, an evacuation assembly affixed to a second through-penetration in the vehicle container, and an intake penetration with a cap affixed to a third through-penetration in the vehicle container. A method is also provided to assess the interior of a vehicle or shipping container for hazardous gases or vapors prior to opening the container.

13 Claims, 3 Drawing Sheets

VEHICLE TRAILER OR SHIPPING CONTAINER MONITORING AND EVACUATION ASSEMBLY

GOVERNMENT INTEREST

The invention described herein may be manufactured, used, and/or licensed by or for the United States Government.

FIELD OF THE INVENTION

The present invention relates to hazardous waste transport, and in particular to a vehicle trailer or shipping container monitoring and evacuation system that can be used to sample the interior environment of a trailer or container transporting material having the potential to create a hazardous environment during transport, and to evacuate the hazard if this condition is confirmed.

BACKGROUND OF THE INVENTION

There are thousands of vehicle for private, public, and governmental use that transport hazardous materials every day. However, there are no requirements for the vehicle trailer or shipping container housing the materials to be tested prior to opening and unloading once at the receiving site.

Potential exposure to hazardous environments that may contain toxic materials such as chemical warfare agents (CWA), biological warfare agents (BWA), radioactive materials, and toxic industrial chemicals (TIC) among others, is possible during transport of these materials. Many of these toxic chemicals present a lethal threat upon exposure. These chemicals can be released in either a gaseous, vapor, or liquid form, and can contaminate surfaces upon contact. Lethality can occur through different pathways and may include inhalation or being absorbed through the skin. An example of hazardous waste being hauled for governmental use are trailers that are used to transport hazardous waste contaminated with chemical warfare agents (CWA) to permitted treatment, storage, and disposal facilities (TSDFs).

In those instances where a facility is responsible for storage, management, and disposal of hazardous material, yet it lacks on-site facilities for a given type of disposal, such as incineration or residue treatment; there is a need for transport of potentially dangerous materials. Residuals or secondary waste created during disposal include treated waste, as well as rags, tools, or problematic equipment contaminated as a result of the disposal operations.

When the transport of materials to an off-site treatment, storage, and disposal facility (TSDF) is required it must be done safely. While current protocols do not require in transit testing, doing so would further mitigate risk. The ability to analytically assess the transport vehicle's interior trailer environment at the receiving facility prior to opening and unloading material contained therein provides additional controls in the event of compromise during transit. However, transport trailers and waste hauling vehicles are not equipped with built in mechanisms allowing for the sampling of the air inside.

Thus, there exists a need for a system that is built-in the vehicle and provides the ability to analytically assess the interior environment prior to opening the interior volume and unloading. Doing so is a safety improvement for the facility workforce and affords additional protections to the environment.

SUMMARY OF THE INVENTION

A vehicle trailer or shipping-container monitoring system is provided. The system is used to sample the environment within a vehicle container such as a trailer, and if needed, clear a potentially hazardous material from the interior of the vehicle container volume prior to conventional opening. The system includes: a monitoring assembly affixed to a first through-penetration in the vehicle container; an evacuation assembly is affixed to a second through-penetration in the vehicle container; and an intake penetration with a cap affixed to a third through-penetration in the vehicle container.

A method is also provided to assess an interior of a vehicle container such as a trailer for hazardous vapors prior to opening the trailer.

BRIEF DESCRIPTION OF THE DRAWINGS

The present invention is further detailed with respect to the following figures that depict various aspects of the present invention.

DETAILED DESCRIPTION OF THE PREFERRED EMBODIMENTS

Figure 1:
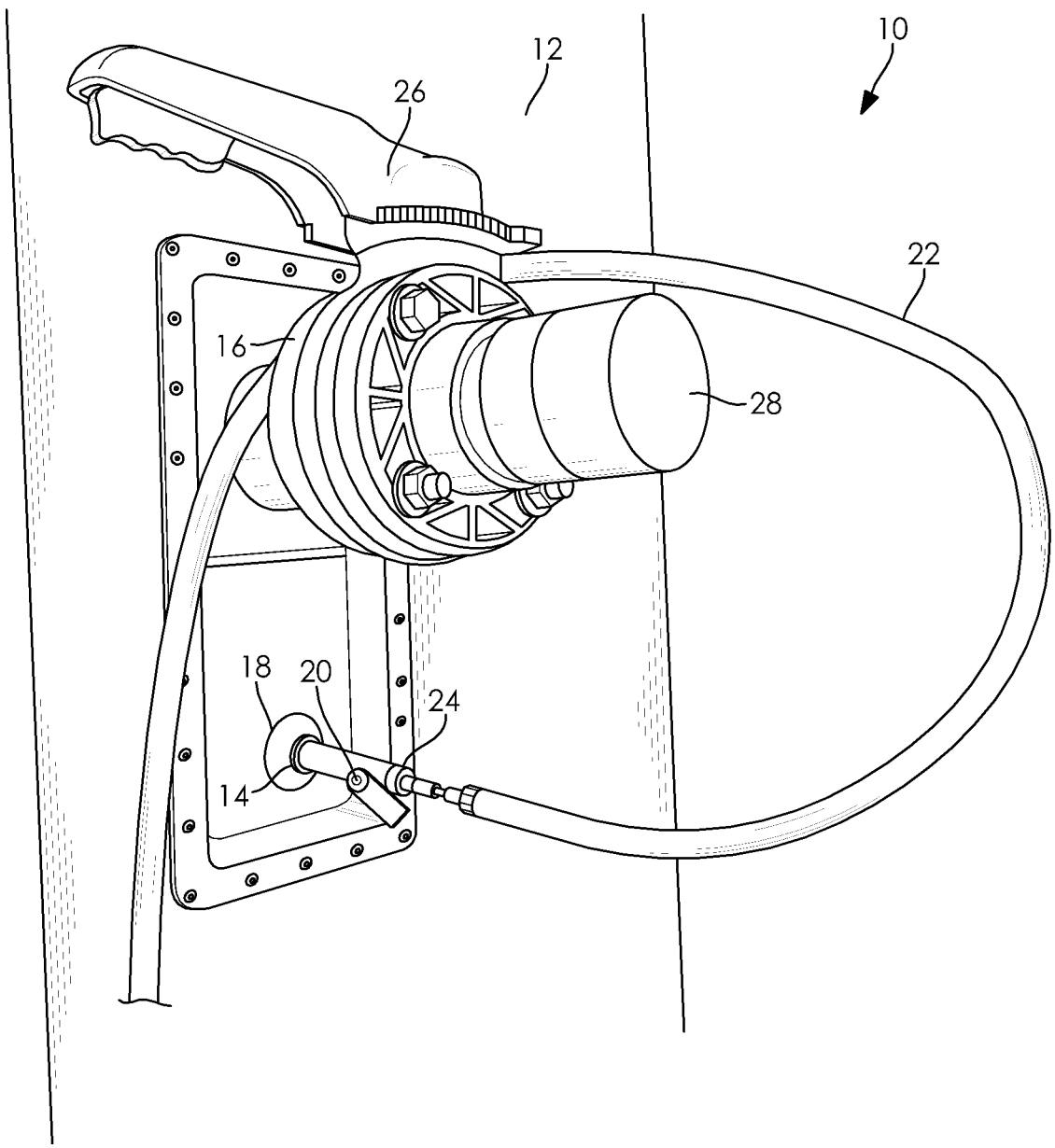
FIG. 1 is a partial perspective view of a trailer rear door with a trailer monitoring assembly and an evacuation assembly incorporated into a pass through built into the rear door in accordance with embodiments of the invention.

The present invention has utility as a monitoring system that is used to sample the environment inside a vehicle trailer or shipping container such as those transporting material having the potential to create a hazardous environment in the interior of the vehicle trailer or shipping container during transport, and if detected, in some embodiments to evacuate the hazard in a controlled way prior to conventional opening of the vehicle trailer or shipping container. A non-limiting example is a truck trailer used to transport hazardous waste contaminated with chemical warfare agents (CWA), or other toxic chemicals. Truck trailers outfitted with embodiments of the invention may be used to transport hazardous waste contaminated with chemical warfare agents to permitted treatment, storage, and disposal facilities (TSDFs). When the trailer arrives at the TSDF, analytical equipment can be attached to the inventive trailer monitoring system to quantitatively assess the interior environment of the trailer prior to the trailer being opened. If the load is found to be compromised, an evacuation port of the inventive system can be used to safely evacuate the trailer environment to a TSDF treatment system. It is appreciated that with the increase in multimodal transport from ship to train to trailer trucks, shipping cargo containers may also be outfitted with embodiments of the invention.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Unless indicated otherwise, explicitly or by context, the following terms are used herein as set forth below. As used in the description of the invention and the appended claims, the singular forms "a," "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

As used herein, a vehicle container is intended to include a devoted truck trailer, tank truck trailer, a panel truck containing any of chemical containing totes, barrels, pails, or fiber packs; a shipping container; intermodal shipping containers; a rail car; or any other transport containers.

In a specific embodiment of the inventive system, two penetrations are made through a vehicle container door, both penetrations with valves normally in the closed position. In still other inventive embodiments, one penetration is fitted with national pipe thread (tapered) (NPT) stainless pipe with a ball valve and is used to analytically assess the interior of the vehicle container and the second penetration is used to evacuate the atmosphere from the vehicle container if it is found to be contaminated. The second penetration may be fit with polyvinyl chloride (PVC) pipe sealed with a ball valve. It is appreciated that the penetrations can vary in size relative to one another. In certain inventive embodiments, a quarter-inch diameter first penetration and a four-inch diameter second penetration are well suited to sample and evacuate the interior of the vehicle container. To promote the evacuation of the vehicle container, an intake penetration throughhole is also provided and is capped when not in use. In some inventive embodiments, the intake penetration through-hole is remote from the second penetration to promote exchange of the atmosphere in the interior of the vehicle container. In some inventive embodiments, the intake penetration through-hole is in the front of the vehicle container while the other penetrations are located in the container access door at the rear. It is appreciated that these various penetrations can be located in nearly any locations on the vehicle trailer or shipping container and still retain the function of present invention. When the vehicle container requires evacuation, the cap is removed to prevent cavitation during evacuation, as a vacuum is applied to the interior of the vehicle container.

Embodiments of the inventive system have two primary subsystems: a monitoring assembly and an evacuation assembly.

The monitoring assembly provides the physical connections to allow for screening of the interior of the vehicle container using an air monitoring and analysis device. An example of an air monitoring and analysis device is a Miniature Continuous Air Monitoring System (MINI-CAMS) and/or Depot Area Air Monitoring System (DAAMS). The MINICAMS® series is an automatic, near-real-time continuous air monitoring system using gas chromatography and sample collection with a solid-adsorbent preconcentrator or fixed-volume sample loop, marketed and sold by OI Analytical/Xylem, Inc. The MINICAMS® collects an air sample, performs an analysis, and reports the result. A DAAMS is a high-throughput, automated thermal desorption instrument for streamlined analysis of air samples including an analytical program for determination and confirmation of airborne levels of chemical agent in the event of a suspected release, such as those marketed and sold by Markes International.

The vehicle container monitoring assembly includes the following parts: a pass-through to inside the container, a sealing valve that in specific embodiments is a lower quarter-turn ball valve, a port connector that in specific embodiments is made by SWAGELOK®. In still other embodiments, a heated sample line (HSL) is provided to inhibit condensation and promote volatility of the analytes in transit to detection equipment. The pass-through to inside of the vehicle container may be a stainless-steel fitting that penetrates the vehicle container, such as for example through a door and provides the passageway for the interior atmosphere to be sampled. The sealing valve may be a lower quarter-turn ball valve and allows for isolation of the interior of the vehicle container during transport. This sealing valve is normally in the closed position. The sealing valve is opened only when monitoring the interior atmosphere of the trailer. The port connector in some inventive embodiments is a stainless-steel fitting that connects a male end to a heated sample line when the air monitoring and analysis device is a MINICAMS®, or the port connector is a union tee when the air monitoring and analysis device is a DAAMS, to connect the male end of the bulkhead fitting attached to the lower quarter-turn ball valve. In a specific inventive embodiment, the port connector or the union tee is a quarter inch fitting. In typical operation, at all times other than during interior monitoring or system testing, a seal, that in specific embodiments is a quarter inch plug is attached to the bulkhead fitting thereby sealing the end of the port connector. In specific embodiments, in the case of a MINICAMS® as the air monitoring and analysis device, the heated sample line (HSL) transports the air sampled from the inside of the vehicle container to the air monitoring and analysis device. The sample line is heated to inhibit condensation of analytes, such as for example, chemical warfare agents. It is appreciated that the use of an HSL has less value in air monitoring and analysis devices that are DAAMS. Atmospheric samples using DAAMS are typically collected directly onto the DAAMS tubes.

The evacuation assembly provides the connection for a ventilation/evacuation line, which in some inventive embodiments is a snorkel ventilation line, and a pathway for toxic vapors to be safely routed to the TSDF until corrective measures can be implemented to mitigate the release. In some inventive embodiments the second penetration for the evacuation assembly is larger in diameter than the first penetration, and is used to evacuate the potentially hazardous vapors from the interior of the vehicle container. The second penetration is typically sealed with an upper ball valve assembly when not in use. In a specific inventive embodiment, the upper ball valve is an upper quarter-turn ball valve with flange, which provides for isolation of the interior of the vehicle container. The upper ball valve is normally in a closed position and is opened only in the event of a confirmed triggering of a toxic vapor alarm as sensed by the air monitoring and analysis devices or for routine testing. The upper ball valve when not in use is typically closed with a cap. In a specific inventive embodiment, a four-inch PVC cap fitting is attached to the flange on the upper ball valve assembly. The removal of the cap allows for connection to the ventilation/evacuation line in the event of a confirmed toxic hazard alarm, which is vented directly to an incinerator unit.

Referring now to the figures, FIG. 1 is a partial perspective view of a vehicle container 10 with a door 12 visible with a monitoring assembly 14 and an evacuation assembly 16 incorporated into a pass through 18 built into the door 10. The monitoring assembly 14 has a first sealing valve 20 (shown as a quarter-turn ball valve) that in the configuration shown is connected to a heated sample line (HSL) 22 via a port connector 24. The heated sample line (HSL) 22 as described above may be connected to an air monitoring and analysis device (shown in FIG. 3 as 40). The evacuation assembly 16 includes a second sealing valve 26 (shown as a quarter-turn ball valve) and a termination cap 28 that covers a set of threads or interlocking connector. The cap 28 is removed to expose the set of threads or interlocking connector to which a ventilation/evacuation line 52 (shown in FIG. 3) is attached to transport toxic vapor to an incinerator.

Figure 2:
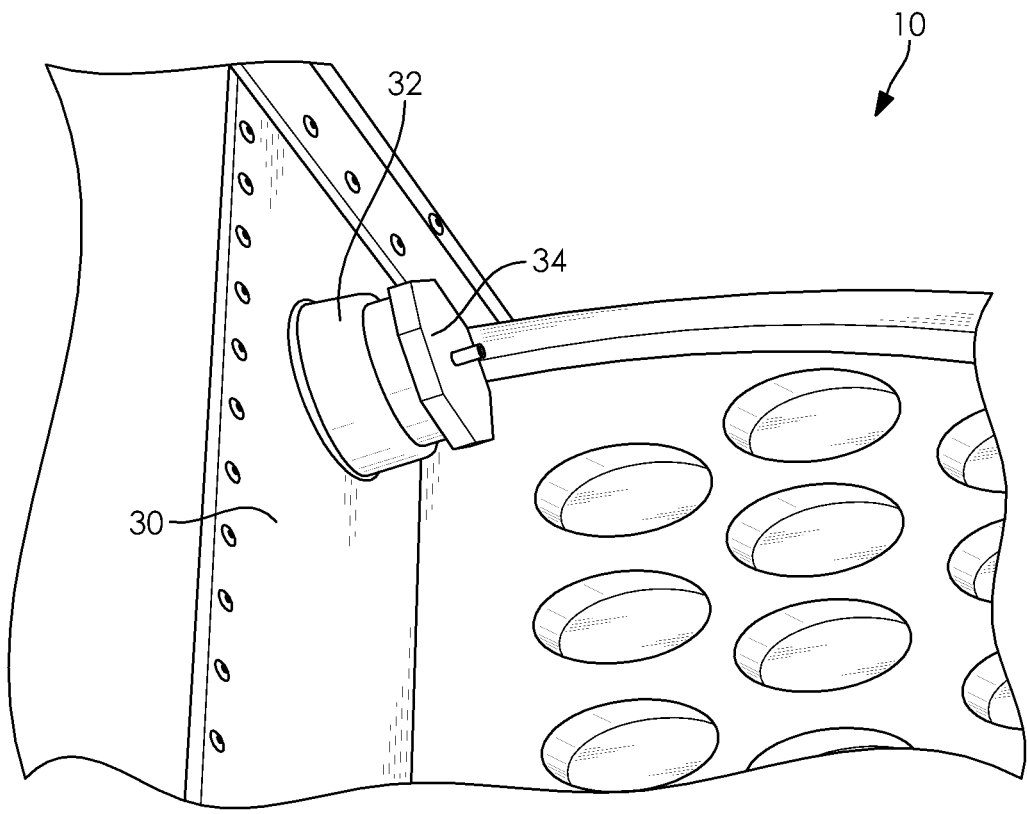
FIG. 2 is a partial perspective view of the front exterior wall of the trailer of FIG. 1 with an intake penetration incorporated into the front exterior wall in accordance with embodiments of the invention.

FIG. 2 is a partial perspective view of the front exterior wall 30 of the vehicle container 10 of FIG. 1 with an intake tube penetration 32 incorporated into the front exterior wall 30. The intake tube penetration 32 has a removable cap 34. The cap 34 is removed when a vacuum is applied to the ventilation/evacuation line 52 to clear toxic vapors from the trailer so as to avoid cavitation of the trailer body.

Figure 3:
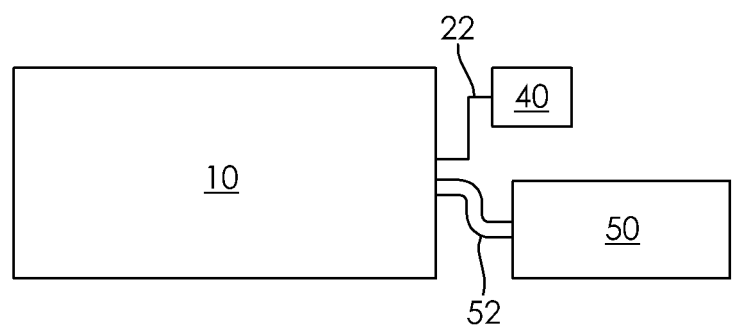
FIG. 3 is an overall system view of a trailer being tested and evacuated of toxic vapors at a permitted treatment, storage, and disposal facility.

FIG. 3 is an overall system view of a vehicle container 10 being tested and evacuated of toxic vapors at a permitted treatment, storage, and disposal facility. The trailer 10 is shown with a sampling line 22 which as described above is a heated sample line (HSL) connected to an air monitoring and analysis device 40, that may be a MINICAMS®. As noted above when an air monitoring and analysis device in the form of a DAAMS is used, it obtains air samples collected directly onto the DAAMS tubes, so no sample line 22 is present. In the event toxic fumes are detected, a ventilation/evacuation line 52 is connected to an incinerator 50 to safely destroy the accumulated toxic fumes contained within the trailer 10. It is appreciated that a cargo container used in a multi-modal transport system may take the place of a dedicated truck trailer with a similar form factor to the dedicated truck trailer 10. Cargo containers are dimensioned to fit on a flatbed trailer.

Figure 4:
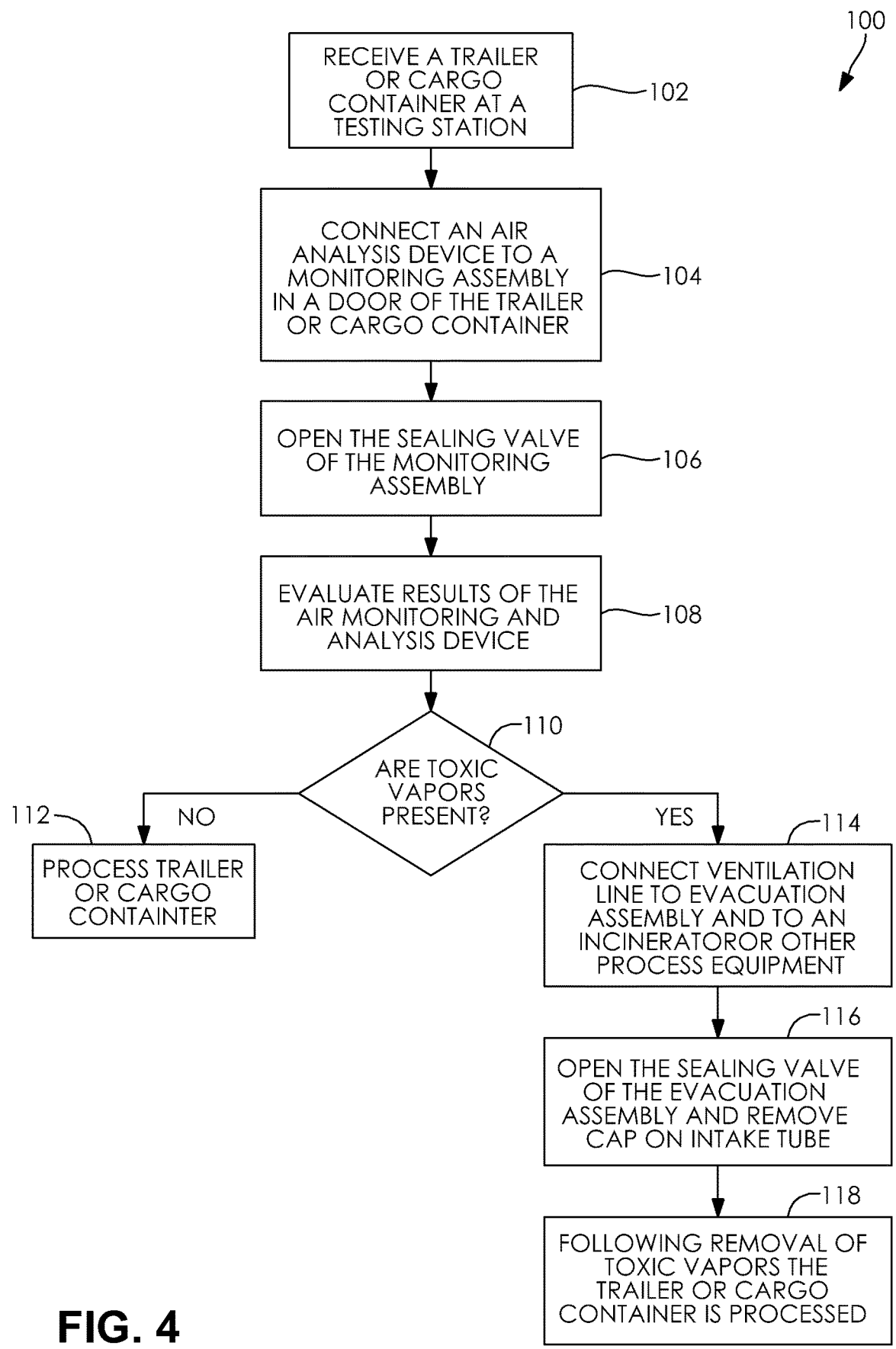
FIG. 4 is a flowchart representation of a method to analytically assess an interior trailer environment at the receiving facility prior to opening the trailer in accordance with embodiments of the invention.

FIG. 4 is a flowchart representation of a method 100 to analytically assess an interior of a vehicle container at a receiving facility prior to conventional opening of the vehicle container. The method starts by receiving a vehicle container 10 at a testing station (Step 102). Subsequently, an air monitoring and analysis device 40 is connected to a monitoring assembly 14 in the door 12 of the vehicle container (Step 104). Once the connections are secure the sealing valve 20 to the monitoring assembly 14 is opened to allow for sampling of the atmosphere within the trailer or cargo container (Step 106). The results of the air monitoring and analysis device 40 are evaluated to determine if toxic vapors are present in the trailer or cargo container 10 (Step 108). A determination is made if toxic vapors are present (Step 110) at a pre-selected level. If toxic vapors are not present at the pre-selected level (Step 110 is No), the vehicle container 10 is processed immediately for unloading and disposition of contents (Step 112). If toxic vapors are present (Step 110 is Yes) the vehicle container 10 undergoes additional processing to remove the toxic vapors that have accumulated in the vehicle container 10 during shipment. A ventilation/evacuation line 52 is connected to the evacuation assembly 16 on the door 12 of the vehicle container 10 and to an incinerator or other vapor collection or process equipment 50 (Step 114). Once the connection of the ventilation/ evacuation line 52 is secure, the sealing valve 26 of the evacuation assembly 16 is opened and the cap 34 on the intake tube 32 of the vehicle container is removed (Step 116). The contaminated atmosphere (toxic gases/vapors) within the container is then drawn out for processing until the interior of the container is safe. Following removal of toxic vapors, the vehicle container 10 is processed for unloading and disposition of contents (Step 118) in a conventional manner.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention but is not meant to be a limitation upon the practice thereof. The following claims, including all equivalents thereof, are intended to define the scope of the invention.

The invention claimed is:

1. A system for assessing and evacuating the interior air environment of a vehicle trailer or shipping container, comprising:
   a monitoring assembly affixed to a first through-penetration in the vehicle trailer or shipping container to provide for sampling of the air inside the vehicle trailer or shipping container, wherein the monitoring assembly comprises a first sealing valve terminated with a port connector;
   an evacuation assembly affixed to a second through-penetration in the vehicle trailer or shipping container; and
   an intake penetration with a cap affixed to a third through-penetration in the vehicle trailer or shipping container; and
   wherein said evacuation assembly and intake penetration provide for the safe evacuation of the air inside the vehicle trailer or shipping container prior to opening the vehicle trailer or shipping container when it is contaminated with toxic gases or vapors.

2. The system of claim 1, wherein the first sealing valve is a quarter-turn ball valve.

3. The system of claim 1, wherein the port connector is a fitting configured to connect with a sample line that can be connected to an air monitoring and analysis device capable of detecting toxic gases and vapors.

4. The system of claim 3, wherein the sample line is a heated sample line.

5. The system of claim 1, wherein the port connector is a union tee configured to connect directly to an air monitoring and analysis device.

6. The system of claim 1, wherein the evacuation assembly further comprises a second sealing valve terminated with a flange configured for connection to a ventilation/evacuation line.

7. The system of claim 6, wherein the second sealing valve includes a cap for covering and sealing the flange when not connected to the ventilation/evacuation line.

8. The system of claim 6, wherein the flange has a set of threads or an interlocking connector.

9. The system of claim 6, wherein the ventilation/evacuation line is a snorkel ventilation line.

10. The system of claim 6, wherein a distal end of the ventilation/evacuation line can be connected to a processing unit for treatment or destruction of any toxic gases or vapors.

11. The system of claim 10, wherein the processing unit is an incinerator.

12. The system of claim 1, wherein the third through-penetration is positioned remotely from the second through-penetration in the vehicle trailer or shipping container.

13. The system of claim 12, wherein the second through-penetration is in a door of the vehicle trailer or shipping container and the third through-penetration is in an opposite wall of the vehicle trailer or shipping container or vice versa.

\* \* \* \* \*